United States Patent
Gerat et al.

(10) Patent No.: US 7,601,087 B2
(45) Date of Patent: Oct. 13, 2009

(54) METHOD OF FABRICATING A REDUCER, AND A ROBOT INCORPORATING SUCH A REDUCER

(75) Inventors: Vincent Gerat, Saint Jorioz (FR); Pascal Mariotte, Menthon Saint Bernard (FR)

(73) Assignee: Staubli Faverges, Faverges (FR)

( * ) Notice: Subject to any disclaimer, the term of this patent is extended or adjusted under 35 U.S.C. 154(b) by 429 days.

(21) Appl. No.: 11/701,468

(22) Filed: Feb. 2, 2007

(65) Prior Publication Data
US 2007/0184930 A1   Aug. 9, 2007

(30) Foreign Application Priority Data
Feb. 6, 2006   (FR) .................................. 06 01032

(51) Int. Cl.
*F16H 1/32* (2006.01)
(52) U.S. Cl. ...................................... 475/162
(58) Field of Classification Search ................. 475/162, 475/178, 331
See application file for complete search history.

(56) References Cited

U.S. PATENT DOCUMENTS

| | | | |
|---|---|---|---|
| 1,694,031 A * | 12/1928 | Braren | 475/168 |
| 1,767,866 A * | 6/1930 | Wildhaber | 475/178 |
| 4,898,065 A | 2/1990 | Ogata et al. | |
| 4,898,076 A | 2/1990 | Bigo et al. | |
| 5,312,305 A | 5/1994 | Palau | |
| 5,472,384 A * | 12/1995 | Haga | 475/162 |
| 5,616,095 A * | 4/1997 | Pruitt | 475/178 |
| 6,805,650 B2 * | 10/2004 | Branov et al. | 475/162 |
| 7,216,845 B1 * | 5/2007 | Jones | 251/248 |
| 2005/0221941 A1 * | 10/2005 | Nihei et al. | 475/178 |

FOREIGN PATENT DOCUMENTS

| EP | 0305535 | 3/1989 |
|---|---|---|
| EP | 0543754 | 5/1993 |

* cited by examiner

*Primary Examiner*—Roger L Pang
*Assistant Examiner*—Justin Holmes
(74) *Attorney, Agent, or Firm*—Dowell & Dowell, P.C.

(57) ABSTRACT

In order to fabricate an epicycloidal reducer including at least one circular cam (13, 15) whose outer peripheral edge (133, 153) is provided with a first set of teeth (134, 154) suitable for co-operating with a stationary second set of teeth, said cam being pierced by at least a first bore (135, 155) for receiving a drive finger held stationary in a second bore (176) formed in a support (17) secured to an outlet shaft of the reducer, the first bore (135, 155) in the or each cam (13, 15) and the second bore (176) in the support (17) are machined at least in part in a single operation while in alignment ($X_2$) one with the other.

6 Claims, 2 Drawing Sheets

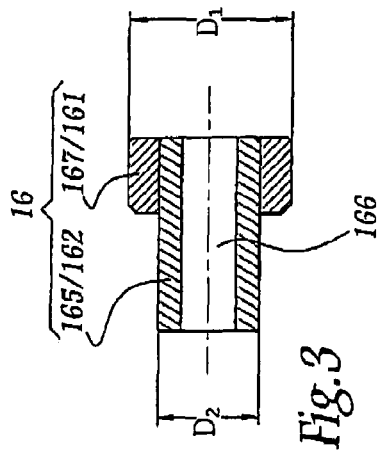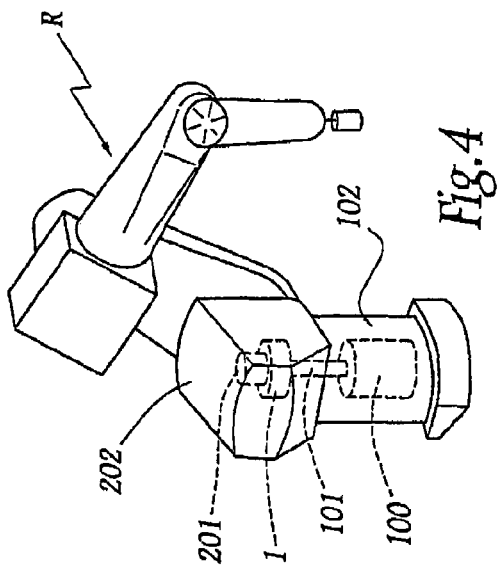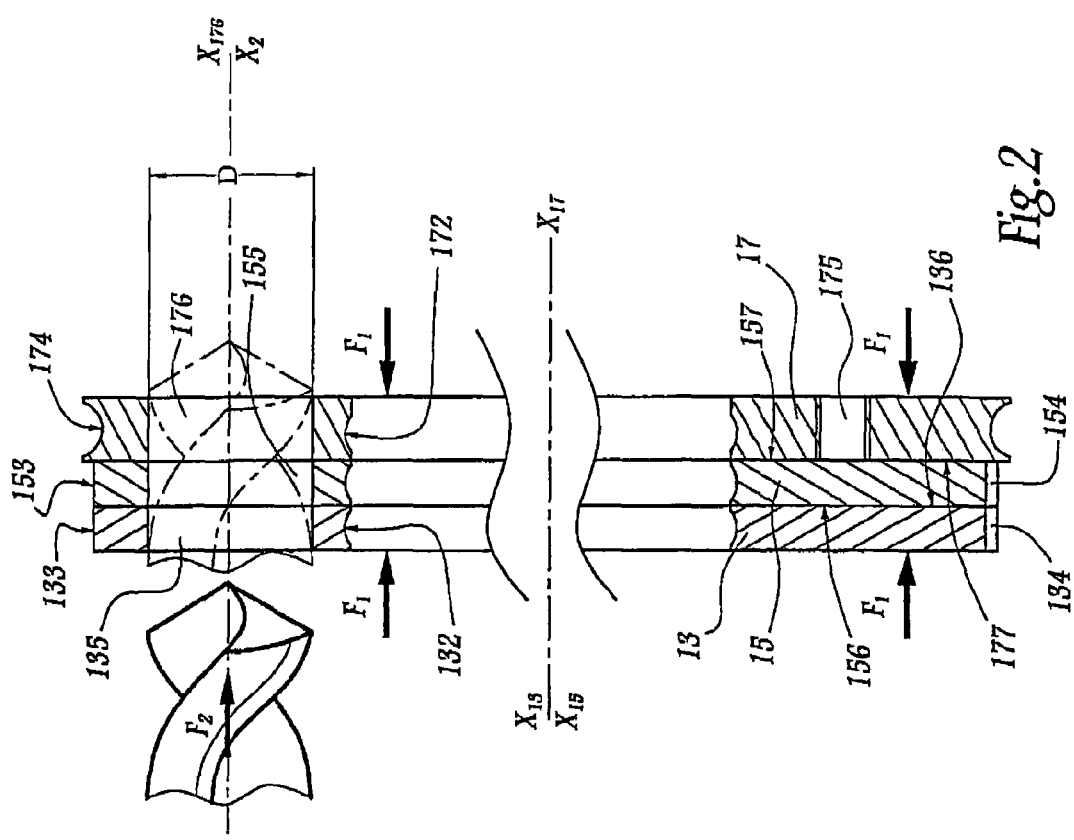

METHOD OF FABRICATING A REDUCER, AND A ROBOT INCORPORATING SUCH A REDUCER

The invention relates to a method of fabricating an epicycloidal reducer, and also to a reducer obtained by this method. The invention also relates to a robot fitted with such a reducer.

In order to actuate a robot arm or other handling equipment in angular manner, it is known to make use of an epicycloidal reducer, sometimes referred to as "cycloidal" gearing, in order to transmit motion from the outlet shaft of a motor to a moving portion of the robot, while reducing the angular speed of said motion.

It is known from EP-A-0 543 754 and U.S. Pat. No. 4,898,076 to provide such a reducer with two cams that are eccentric relative to the longitudinal axis of the inlet shaft of the reducer, each cam being provided with teeth for co-operating with inside teeth on a stationary ring. These cams have appropriate orifices for receiving drive fingers secured to a support itself secured to an outlet turntable of the reducer. The quality of such a reducer depends on the accuracy with which the cams are positioned and on their interaction with the drive fingers. To satisfy that positioning problem, EP-A-0 543 754 provides for each finger to be mounted with clearance enabling it to be self-centering in the corresponding housing. To be effective, such self-centering must, in practice, be achieved while the reducer is being put into motion, in order to enable each finger to reach the best adapted position. Such adjustment is difficult to perform and leaves a great deal to assessment by the operator.

That is one of the drawbacks that the invention seeks most particularly to remedy, by proposing a method of fabricating an epicycloidal reducer that enables the cam(s) of the reducer to be centered accurately on the corresponding drive finger(s) without requiring complex intervention on the part of the operator during assembly of the reducer.

To this end, the invention relates to a method of fabricating an epicycloidal reducer including at least one circular cam having an outer peripheral edge provided with a first set of teeth suitable for co-operating with a stationary second set of teeth in which the number of teeth is different from the number of teeth in the first set, said cam being pierced by at least one first bore for receiving a drive finger held stationary in a second bore formed in a support secured to an outlet shaft of said reducer. The method is characterized in that it further includes a step consisting in:

a) machining at least partially in a single operation said first and second bores in alignment with each other.

By machining the first and second bores during a single operation, these bores can be accurately aligned, such that a finger held in the bore of the support is automatically positioned optimally relative to the bore of the or each cam.

According to aspects of the invention that are advantageous but not essential, such a method may incorporate one or more of the following characteristics:

it includes a step b), consisting in pressing said cam against said support prior to step a), and a step c) consisting in subjecting said cam and said support as pressed one against the other in this way to a clamping force at least during step a);

during step c) said cam and said support have surfaces pressing against each other in the zone in which said bores are machined and, optionally, two adjacent cams have surfaces pressing against each other in said zone;

during step a), said bores are machined to the same diameter; and when the method is used for fabricating a reducer comprising a plurality of cams, each provided with at least one bore, the first bores in all of the cams are machined together with the corresponding second bores of the support during step a).

The invention also relates to an epicycloidal reducer which can be fabricated according to the above described method and which includes at least one circular cam having an outer peripheral edge provided with a first set of teeth suitable for co-operating with a stationary second set of teeth in which the number of teeth is different from the number of teeth in the first set, said cam being pierced by at least one first bore for receiving a drive finger held stationary in a second bore formed in a support secured to an outlet shaft of said reducer. This reducer is characterized in that said first and second bores, provided respectively on the cam and on the support, are identical in diameter.

The reducer of the invention thus enables the drive fingers to be mounted accurately and quickly.

According to aspects of the invention that are advantageous but not essential, such a reducer may incorporate one or more of the following characteristics:

said finger is stepped and comprises two portions of different diameters, a first portion having a diameter substantially equal to the diameter of said bores and being received in a bore of said support, while a second portion of diameter smaller than the diameter of the first portion is received in a bore of said or of each cam;

the reducer includes at least two cams that are eccentric in opposition about the axis of the inlet shaft of the reducer, and the diameter of said bores is substantially equal to the sum of the diameter of the second portion of said finger plus twice the eccentricity of said cams;

said or each cam is pierced by a plurality of bores distributed around its axis of rotation about the inlet shaft of said reducer, each bore receives a drive finger held stationary on said support, and a ring is constrained to rotate with the ends of said fingers that are opposite from said support;

said or each drive finger is held stationary on said support by means of a screw extending along the longitudinal axis of said finger and screwed into said support or into a part that is secured thereto.

Finally, the invention relates to a robot having a moving portion driven by a motor by means of a reducer as described above. Such a robot is more reliable and less expensive than those of the state of the art.

The invention can be better understood and other advantages thereof appear more clearly in the light of the following description of a reducer in accordance with the invention and of its method of fabrication, given purely by way of example and made with reference to the accompanying drawings, in which:

FIG. 2 is a fragmentary axial section of certain component elements of the reducer of FIG. 1 during a step in the fabrication of the reducer;

FIG. 3 is an axial section of a drive finger that can be used as a variant in the reducer of FIGS. 1 and 2; and FIG. 4 is a theoretical diagrammatic view of a robot in accordance with the invention and incorporating, amongst other things, the reducer of FIGS. 1 and 2.

Figure 1:
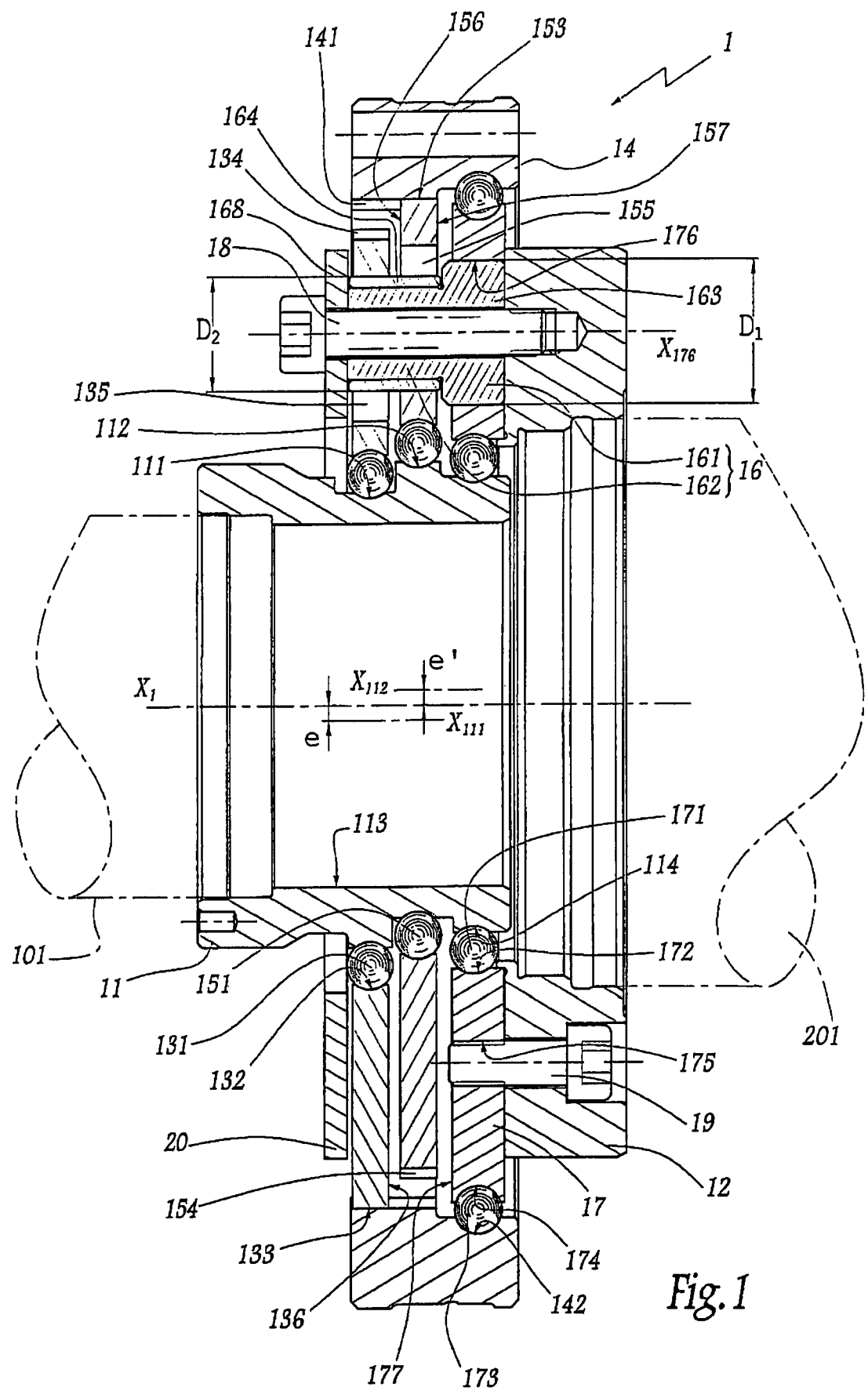
FIG. 1 is an axial section of a reducer in accordance with the invention.

As shown in FIG. 1, the epicycloidal reducer 1, which may also be referred to as "cycloidal" gearing, comprises an inlet flange 11 centered on an axis of rotation that is also the axis of rotation of an outlet flange 12 of the reducer. The flange 11 is for securing to the outlet shaft 101 of an electric motor 100 that is provided in the base segment 102 of a multi-axis robot R shown in FIG. 4. The flange 12 is for securing to a drive shaft 201 for rotating a portion 202 of the robot R that is movable relative to its base.

Other reducers of the same type may be included in the robot R for transmitting rotary movement between other electric motors and other moving portions of the robot arm.

In practice, the flange 11 forms the inlet shaft of the reducer 1, whereas the flange 12 forms the outlet shaft thereof.

The flange 11 is provided with two external bearing surfaces 111 and 112 forming raceways that are eccentric relative to the axis $X_1$ about which the inside surface 113 of the flange 11 is centered. The surface 111 is centered on an axis $X_{111}$, parallel to the axis $X_1$ and offset relative thereto by an offset e. The surface 111 is toroidal such that the offset e measures the eccentricity of the surface 111 relative to the axis $X_1$. In the same way, the surface 112 is toroidal and centered on an axis $X_{112}$ parallel to the axis $X_1$, the axis $X_{112}$ being opposite to the axis $X_{111}$ about the axis $X_1$. In other words, the eccentricity e' of the surface 112 relative to the axis $X_1$ is equal to the value of the eccentricity e of the surface 111 relative to said axis.

A first cam 13 is placed around the surface 111, with balls 131 being interposed to form a ball bearing between the surface 111 and the radially-inner surface 132 of the cam 13. The cam 13 is annular and its outer edge 133 is provided with teeth that form a set of teeth 134 for co-operating with a set of teeth 141 formed on the radially-inner surface of a stationary ring 14.

A second cam 15 is placed around the surface 112, with a set of balls 151 interposed therebetween to form a ball bearing. The radially-outer edge 153 of the cam 15 is provided with a set of teeth 154 meshing with the set of teeth 141.

The number $N_2$ of teeth in the set 141 is slightly greater, e.g. by unity, than the number of teeth $N_1$ in the sets 134 and 154, which sets are identical.

The cam 13 is pierced by twelve bores of axes that are equidistant on a circle of center that coincides with the axis of rotation of the cam about the inlet flange 11. Only one bore is visible in FIG. 1 under the reference 135. In the same way, the cam 15 is pierced by twelve bores, only one of which is visible with the reference 155. These bores 135 and 155 are designed to be in overall alignment and together to receive a drive finger 16 secured to a support 17 on which it is mounted by means of a screw 18.

The support 17 is in the form of an annular plate and it is supported around the flange 11 by a set of balls 171 disposed between the radially-inner surface 172 of the support 17 and a bearing surface 114 formed on the outer surface of the flange 11 and centered on the axis $X_1$.

A second set of balls 173 is interposed between the radially-outer surface 174 of the support 17 and a corresponding bearing surface 142 of the ring 14.

The support 17 is secured to the flange 12 by means of twelve screws 19 that co-operate with tapped holes 175 formed in the support 17.

When held stationary on the support 17, each drive finger 16 is received in a bore 176 in the support 17. Each finger 16 is held in place on the assembly constituted by the support 17 and the flange 12 by the compression force exerted by the corresponding screw 18.

References $X_{13}$, $X_{15}$, and $X_{17}$ denote the central axes of the cams 13 and 15 and of the support 17, respectively. When the reducer 1 is in its assembled configuration, the axes $X_{13}$ and $X_{15}$ are the axes of rotation of the cams 13 and 15 about the flange 11. They coincide respectively with the axes $X_{111}$ and $X_{112}$. Similarly, in that configuration, the axis $X_{17}$ is the axis of rotation of the support 17 and it coincides with the axis $X_1$.

As can be seen more particularly from FIG. 2, during fabrication of the reducer 1, the two cams 13 and 15 and the support 17 are pressed against one another and then subjected to a clamping force represented by arrows $F_1$ in the figure. The effect of this force is to press a side face 136 of the cam 13 against a first side face 156 of the cam 15, and to press the other side face 157 of said cam 15 against a side face 177 of the support 17.

In this clamp configuration of the parts 13, 15, and 17, the axes $X_{13}$, $X_{15}$, and $X_{17}$ coincide and the sets of teeth 134 and 154 coincide, i.e. they have their respective teeth in alignment parallel to the axes $X_{13}$, $X_{15}$, and $X_{17}$.

With the elements 13, 15, and 17 thus firmly pressed one against another, as many groups of bores 135, 155, and 176 are formed as are required by moving a tool, such as drill bit 300, perpendicularly to the faces 136, 156, 157, and 177, i.e. parallel to the axes $X_{13}$, $X_{15}$, and $X_{17}$, which then coincide. The movement of the drill bit 300 between its position shown in continuous lines and its position shown in chain-dotted lines is represented by arrow $F_2$ in FIG. 2.

In this way, the bores 135, 155, and 176 are accurately in alignment on a common axis $X_2$ parallel to the axes $X_{13}$, $X_{15}$, and $X_{17}$.

The bores 135, 155, and 176 made with the drill bit 300 all have the same diameter D.

After the bores 135, 155, and 176 have been drilled, these bores can be rectified together to the diameter D, or to a diameter that is slightly greater, while the clamping force $F_1$ is maintained. The cams 13 and 15 and the support 17 present plane faces 136, 156, 157, and 177 that are machined with precision, such that while they are pressed against one another and subjected to the clamping force $F_1$, the surface to be machined in order to create the bores 135, 155, and 176 is practically uninterrupted. Machining conditions are thus uniform between the parts 13, 15, and 17, thereby guaranteeing good precision.

In other words, since the surfaces 136, 156, 157, and 177 bear against one another surface-on-surface in their zones where the bores 135, 155, and 176 are to be formed, the drill bit 300 drills through the three parts 13, 15, and 17 as though they constitute a single part. Similarly, a tool can rectify the bores as though they constitute a single bore.

After these operations have been completed, the relative positions of the parts 13, 15, and 17 are marked, in particular their respective relative orientations about the axis $X_{17}$.

Thereafter, when the reducer 1 is assembled, the cams 13 and 15 are disposed respectively about the surfaces 111 and 112 in a configuration that is close to that used for the drilling shown diagrammatically in FIG. 2. The sets of bores 135, 155, and 176 made in respective single operations during the step of FIG. 2 are then substantially in alignment, and together they receive respective drive fingers 16.

In order to be held securely in the corresponding bore 176, each finger 16 comprises a first portion 161 of diameter $D_1$ substantially equal to the common diameter D of the bores 135, 155, and 176. Thus, by being received in the bore 176, the portion 161 leads to the finger 16 being accurately centered on the central axis $X_{176}$ of the bore 176.

The finger 16 also comprises a second portion 162 of diameter $D_2$ smaller than the diameter $D_1$, such that this portion 162 can be inserted into the bores 135 and 155, even though these bores are radially offset relative to each other because the raceways or surfaces 111 and 112 are eccentric relative to each other.

In practice, the finger 16 is constituted by a solid part 163 having a shoulder and pierced by a central bore for passing the corresponding screw 18 and forming the portion 161, a ring 164 being installed around said part 163 to co-operate therewith to form the portion 162. Under such circumstances, the diameter $D_2$ is the outside diameter of the ring 164.

Nevertheless, as can be seen in FIG. 3, each finger 16 can be made up of a sleeve 165 having a central bore 166 for receiving a screw 18, with a ring 167 being fitted on the end of the sleeve so as to constitute the portion 161 that is to be held stationary in the support 17. Under such circumstances, the diameter $D_1$ is the outside diameter of the ring 167, while the diameter $D_2$ is the outside diameter of the sleeve 165 forming the portion 162 of the finger 16.

In a variant of the invention that is not shown, the blanks for the bores 135, 155, and 176 can be made separately. Only the step of finishing the bores is then performed as a single operation, with the parts 13, 15, and 17 being grouped together and pressed one against the other, as mentioned above.

In any event, the diameter D of the bores 135 and 155 is equal to the sum of the diameter $D_2$ plus twice the eccentricity e. Thus, each portion 162 of a finger 16 bears simultaneously against the edge of a bore 135 and the edge of a bore 155.

A ring 20 is placed around the flange 11, opposite from the support 17 relative to the cam 13. This ring 20 has the twelve screws 18 passing therethrough and enables forces to be shared between the ends 168 of the fingers 16 remote from the support 17. The ring 20 which is constrained to rotate with the ends 168 of the fingers 16 improves the regularity with which force is transmitted between firstly the cams 13 and 15, and secondly the support 17.

In a variant of the invention that is not shown, the support 17 and the flange 12 may comprise a single piece, in which case the screws 18 are screwed into the support.

The invention is shown above with a reducer comprising two annular cams 13 and 15. Nevertheless, the invention is applicable to a reducer having only one such cam or a reducer having three or more than three cams. In addition, the invention is applicable independently of the exact number of fingers 16, providing at least one such finger is provided.

The invention claimed is:

1. An epicycloidal reducer including at least one circular cam having an outer peripheral edge provided with a first set of teeth suitable for co-operating with a stationary second set of teeth in which the number of teeth is different from the number of teeth in the first set, said cam being pierced by at least one first bore receiving a drive finger held stationary in a second bore formed in a support secured to an outlet shaft of said reducer, the reducer being characterized in that said first and second bores are identical in diameter.

2. A reducer according to claim 1, characterized in that said finger is stepped and comprises two portions of different diameters a first portion having a diameter substantially equal to the diameter of said bores and being received in a bore of said support while a second portion of diameter smaller than the diameter of the first portion is received in a bore of said or of each cam.

3. A reducer according to claim 2, characterized in that it includes at least two cams that are eccentric in opposition about the axis of the inlet shaft of the reducer, and in that the diameter of said bores is substantially equal to the sum of the diameter of the second portion of said finger plus twice the eccentricity of said cams.

4. A reducer according to claim 1, characterized in that said or each cam is pierced by a plurality of bores distributed around its axis of rotation about the inlet shaft of said reducer, in that each bore receives a drive finger held stationary on said support and in that a ring is constrained to rotate with the ends of said fingers that are opposite from said support.

5. A reducer according to claim 1, characterized in that said or each drive finger is held stationary on said support by means of a screw extending along the longitudinal axis of said finger and screwed into said support or into a part that is secured to said support.

6. A robot including a moving portion driven by a motor via a reducer, the robot being characterized in that said reducer is according to claim 1.

* * * * *